United States Patent [19]

Medlock

[11] Patent Number: 4,828,218
[45] Date of Patent: May 9, 1989

[54] MULTIPLE MODE REGULATOR

[75] Inventor: Delmar W. Medlock, Indianapolis, Ind.

[73] Assignee: Ransburg Corporation, Indianapolis, Ind.

[21] Appl. No.: 127,442

[22] Filed: Dec. 2, 1987

[51] Int. Cl.⁴ .......................................... F16K 31/126
[52] U.S. Cl. ..................................... 251/26; 251/28; 118/663; 137/505.14
[58] Field of Search ................... 137/505.14, 624.18, 137/85; 251/26, 28; 118/698, 704, 706, 696; 427/445

[56] References Cited

U.S. PATENT DOCUMENTS

| Re. 32,151 | 5/1986 | Scharfenberger . | |
|---|---|---|---|
| 2,583,664 | 1/1952 | Oldham et al. | |
| 2,806,481 | 9/1957 | Faust . | |
| 3,045,691 | 7/1962 | Young . | |
| 3,053,461 | 9/1962 | Inglis . | |
| 3,150,675 | 9/1964 | Phillips | 137/85 |
| 3,326,228 | 6/1967 | Phillips | 137/86 |
| 3,433,262 | 3/1969 | Ray . | |
| 3,828,807 | 8/1974 | Dawes . | |
| 4,148,932 | 4/1979 | Tada et al. | |
| 4,311,724 | 1/1982 | Scharfenberger . | |
| 4,348,425 | 9/1982 | Scharfenberger . | |
| 4,362,124 | 12/1982 | Fleig . | |
| 4,592,305 | 6/1986 | Scharfenberger . | |
| 4,660,597 | 4/1987 | Cowles . | |

Primary Examiner—Alan Cohan
Attorney, Agent, or Firm—Barnes & Thornburg

[57] ABSTRACT

A system for controlling the rate of flow of a fluid dispensed in a fluid coating material dispensing circuit includes a source of a first fluid coating material to be dispensed from the coating material dispensing circuit, a source of a desired first fluid flow rate-related signal, a fluid utilization output, and a fluid flow rate regulator for controlling the flow rate of the first coating fluid at the fluid utilization output in response to the desired first fluid flow rate-related signal. The regulator includes a first fluid flow rate-related signal input port and a separate and distinct second flow rate-related signal input port, an input port for the first fluid, and an output port for the first fluid. The input port for the first fluid is coupled to the source of the first fluid. The output port for the first fluid is coupled to the fluid utilization output. The source of the first fluid flow rate-related signal is coupled to the first fluid flow rate-related signal input port. The source of the first fluid flow rate-related signal is coupled to the separate and distinct second flow rate-related signal input port.

19 Claims, 3 Drawing Sheets

MULTIPLE MODE REGULATOR

This invention relates to coating material delivery systems and particularly to a system characterized by flow rates variable over a wider range than was heretofore possible. Such widely variable flow rates permit rapid purging of, for example, one color or type of coating material from the coating material distribution circuit during a coating material changeover, while also permitting careful control of the much lower flow rates characteristic of dispensing coating materials.

Some coating material dispensing systems are characterized by frequent changes in the type of coating material being dispensed. An example of such systems is an automotive coating application line on which essentially each car which is conveyed along the line is coated with a different color from the car immediately ahead of it on the line and the car immediately after it on the line. Each type, e.g., color, of coating material has its own characteristics, such as viscosity, and the dispensing system is set up so that one or more regulators in the coating material dispensing circuit for the system are supplied with desired coating material flow rate-related signals which insure that the various different coating materials are dispensed at the appropriate, usually constant, rates from an output terminal of the coating material dispensing circuit.

The technology associated with desired flow rate-related signals for supply to flow rate regulators is discussed in some detail in, for example, U.S. Pat. Nos.: 4,362,124; 4,311,724; 4,348,425; Re. 32,151; and, 4,592,305. However, there exists only a single, generally linear, relationship between the desired flow rate-related signal pressure and the actual flow rate in all prior art coating material flow rate regulators of which applicant is aware. This relationship is usually illustrated graphically and the graph is useful to determine the desired flow rate-related signal pressure necessary to produce a desired flow rate of coating material out of the coating material delivery circuit. All known prior art "air piloted" coating material pressure regulators, as these devices are generally called, provide a single curve (as used in this context, the term curve includes a straight line) for the relationship between desired flow rate-related signal pressure and actual flow rate.

In many automatic paint installations, however, it is desirable due to much lower coating material flow rate requirements to provide a shallower slope to this curve than presently available air piloted regulators provide, at least during coating material dispensing intervals. Then during the cleaning cycle, it would be ideal to return to a curve having a much steeper slope in order to promote a quick, high-volume purging of the coating material from the dispensing circuit before the system must be charged with the next coating material to be dispensed.

It is a primary object of the present invention to provide a regulator which embodies multiple desired flow rate pressure signal versus flow rate characteristics. It is a further object of the present invention to provide a system for causing the regulator to behave according to a selected one of such multiple characteristics.

According to one aspect of the invention, a regulator for controlling the flow rate of a fluid material being dispensed through a coating material dispensing circuit comprises a regulator body defining a cavity, means defining a valve seat region in the cavity, means defining an entry port into the cavity on one side of the seat region, and means defining an exit port from the cavity on the other side of the seat region. A movable valve member includes a valve portion engageable with the valve seat region to close the cavity between the entry port and the exit port. The valve member is movable to a position at which the valve portion is out of engagement with the seat region to open a passageway between the entry port and the exit port. The regulator further includes a first diaphragm, means for mounting the first diaphragm movably in the regulator body to divide the cavity into a first region in fluid communication with the passageway and a second region not in fluid communication with the passageway, a second diaphragm, and means for mounting the second diaphragm movably in the regulator body to divide the second region into a third region and a fourth region. The third region lies adjacent the first region and on the opposite side of the first diaphragm therefrom and the fourth region lies adjacent the third region and on the opposite side of the second diaphragm therefrom. The regulator further includes means defining an entry port into the third region, means defining an entry port into the fourth region and means for coupling the first and second diaphragms to the movable valve member.

Illustratively, the area of the first diaphragm exposed in the first and third regions is relatively greater than the area of the second diaphragm exposed in the third and fourth regions.

Further, according to this aspect of the invention, the regulator further comprises a third diaphragm, means for mounting the third diaphragm movably in the regulator body in the third region, and means providing vent openings through the regulator body from the cavity to the exterior of the regulator body between the first and third diaphragms.

According to another aspect of the invention, a system for controlling the rate of flow of a fluid dispensed in a fluid coating material dispensing circuit includes sources of first and second fluids to be dispensed from the coating material dispensing circuit, means for providing a desired first fluid flow rate-related signal, means for providing a desired second fluid flow rate-related signal, a fluid utilization output, and a fluid flow rate regulator for alternatively controlling the flow rate of the first fluid at the fluid utilization output in response to the desired first fluid flow rate-related signal or the flow rate of the second fluid at the fluid utilization output in response to the desired second fluid flow rate-related signal. The regulator includes a first fluid flow rate-related signal input port and a second fluid flow rate-related signal input port, a selected fluid input port, a selected fluid output port, means for coupling the selected fluid input port alternatively to the source of the first fluid or the source of the second fluid, and means for coupling the selected fluid output port to the fluid utilization output. Means are provided for coupling the source of the first fluid flow rate-related signal to the first fluid flow rate-related signal input port, and for coupling the source of the second fluid flow rate-related signal to the second fluid flow rate-related signal input port.

According to this aspect of the invention, the means for providing the desired second fluid flow rate-related signal comprises a three-way valve having a pilot input port and first and second pilot-controlled ports. The signal at the pilot input port alternatively isolates the first pilot-controlled port and simultaneously vents the second pilot-controlled port or couples the first and second pilot-controlled ports. A pilot signal source is provided, as are means for coupling the pilot signal source to the pilot input port, means for coupling the means for providing the desired first fluid flow rate-related signal and the first fluid flow-rate related signal input port to the first pilot-controlled port, and means for coupling the second fluid flow rate-related signal input port to the second pilot-controlled port.

Further according to this aspect of the invention, the means for coupling the selected fluid input port to the source of the first fluid and to the source of the second fluid comprises a manifold, a first valve, and a second valve. Means are provided for coupling the source of the first fluid to the first valve, the first valve to the manifold, the source of the second fluid to the second valve, the second valve to the manifold, and the manifold to the selected fluid input port.

In addition, according to this aspect of the invention, the second fluid illustratively is a purgative for purging the first fluid from at least a portion of the fluid coating material dispensing circuit. Illustratively, the second fluid is a solvent for the first fluid.

The invention may best be understood by referring to the following detailed description and accompanying drawings which illustrate the invention. In the drawings.

Figure 1:
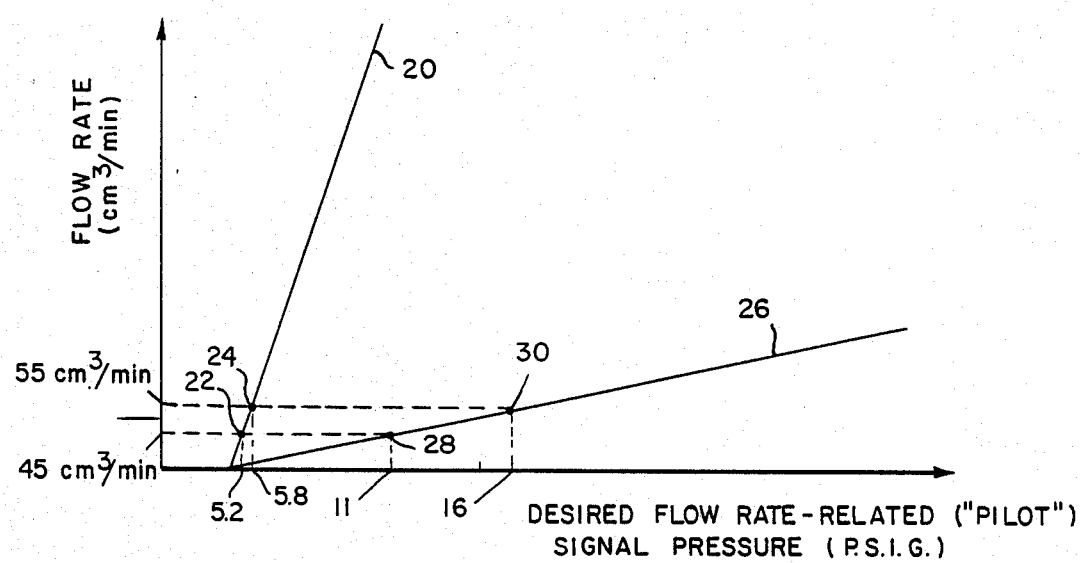
FIG. 1 illustrates two control curves which help explain both a problem with prior art coating material flow rate regulators and how the present invention solves that problem.

Referring now particularly to FIG. 1, the straight line 20 is a plot of fluid delivery rate in $cm^3$/min. versus the pilot signal pressure in p.s.i.g. to a conventional air piloted paint pressure regulator.

Point 22 on curve 20 illustrates the pilot signal pressure of 5.2 p.s.i.g. (3.6 $nt/cm^2$) which must be provided to deliver 45 $cm^3$/min. of a particular coating material through the regulator. point 24 on curve 20 illustrates the pilot signal pressure of 5.8 p.s.i.g. (4 $nt/cm^2$) which must be provided to deliver 55 $cm^3$/min. of that same coating material through the regulator. It will immediately be appreciated that, in order to deliver that particular coating material at any rate in between 45 $cm^3$/min. and 55 $cm^3$/min., the pilot signal pressure will have to be maintained carefully in a range only 0.6 p.s.i. 0.4 $nt/cm^2$) wide. This is frequently difficult to do.

Better control of delivery rate with less pilot signal sensitivity could be obtained if the regulator provided a fluid delivery rate versus pilot signal pressure curve such as curve 26. Curve 26 has a much lower slope than curve 20. As can be seen, point 28 on curve 26 corresponds to a flow rate of 45 $cm^3$/min. and 11 p.s.i.g. (7.6 $nt/cm^2$) (rather than 5.2 p.s.i.g. 3.6 $nt/cm^2$). Point 30 on curve 26 corresponds to a flow rate of 55 $cm^3$/min. and 16 p.s.i.g. (11 $nt/cm^2$) (rather than 5.8 p.s.i.g.—4 $nt/cm^2$). Thus the pilot signal range between 45 $cm^3$/min. and 55 $cm^3$/min has been improved from 0.6 p.s.i. (0.4 $nt/cm^2$) to 5 p.s.i. (3.4 $nt/cm^2$), which is a much easier tolerance to control. However, if curve 26 were the only curve describing the operation of the regulator, very large pilot pressures would be required to drive large volumes of solvent through the coating material dispensing circuit to purge it in the short times provided between coating material dispensing cycles. Therefore, at least during the purging and cleaning cycle, it would be desirable to return to fluid delivery rate versus pilot signal pressure curve 20.

Figure 2:
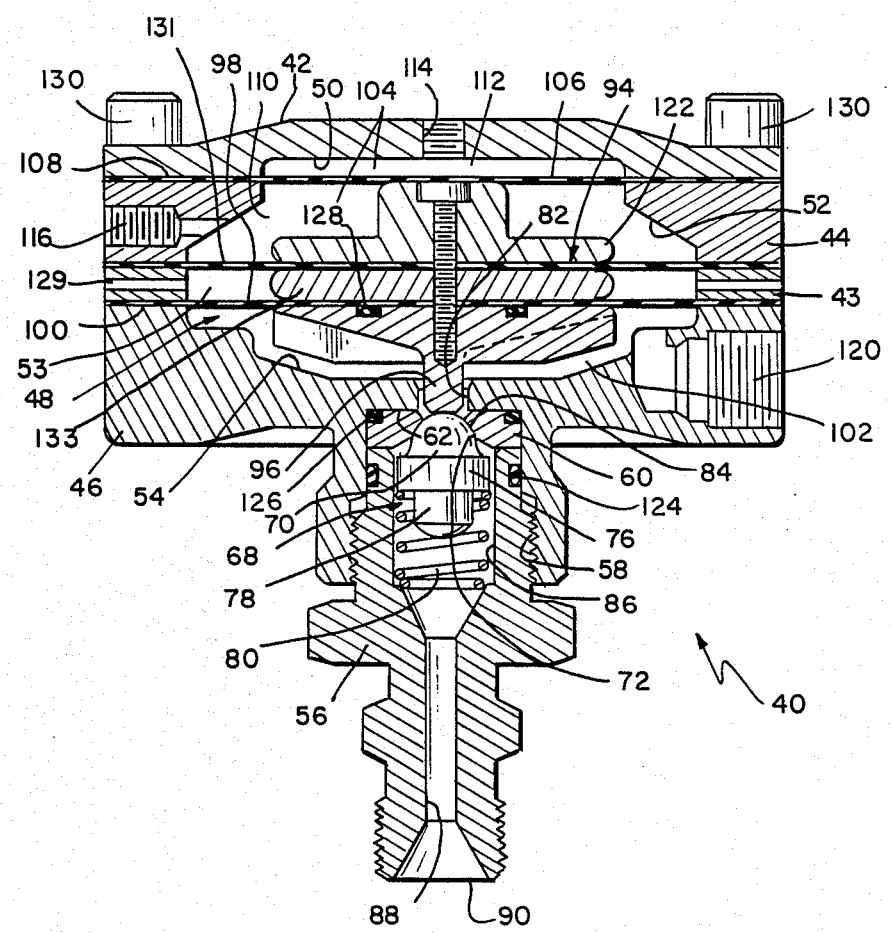
FIG. 2 illustrates a sectional side elevational view of a regulator for controlling the flow rate of a fluid material being dispensed through a coating material dispensing circuit according to the present invention.

Referring now to FIG. 2, a dual mode regulator 40 which permits switching back and forth between the pilot pressure versus flow rate curves 20 and 26 of FIG. 1 is illustrated. The regulator 40 includes a body composed of an upper section 42, intermediate sections 43, 44, and a lower section 46. A cavity 48 is defined within the interiors 50, 52, 53, 54 of the upper section 42, intermediate sections 43, 44, and lower section 46, respectively. Sections through the cavity 48 transverse to the plane of FIG. 2 and extending across FIG. 2 from side to side are generally circular. A combination valve housing and coupler 56 is threaded into a threaded opening 58 at the lower end of lower section 46 and captures a valve seat-providing insert 60 against the underside 62 of lower section 46. Valve housing 56 captures a valve member 68 which includes a generally hemispherical upper portion 70 which cooperates with the valve seat 72 provided on insert 60. Valve member 68 also includes a central generally right circular cylindrical valve guiding portion 76 and a lower, downwardly projecting valve stem portion 78. A coiled compression spring 80 urges the valve member 68 upwardly and the upper portion 70 of valve member 68 into sealing engagement with valve seat 72.

Aligned passageways 82, 84, 86 in lower section 46, insert 60, and valve housing 56, respectively, permit the flow of fluid from the inlet end 90 of valve housing 56 as far as valve seat 72. Beyond the valve seat 72, flow of fluid through regulator 40 is controlled by a valve actuator 94 which includes a downwardly projecting needle 96. Valve actuator 94 is suspended from the center of a first diaphragm 98, the perimeter 100 of which is captured between lower section 46 and intermediate section 44 to divide the cavity 48 into a first region 102 below diaphragm 98 and a second region 104 above diaphragm 98. Second region 104 is divided by a second diaphragm 106 suspended by the capture of its perimeter 108 between intermediate section 43 and upper section 42 into third and fourth regions 110, 112, respectively. A pilot pressure signal inlet 114 is provided into fourth region 112. A pilot pressure signal inlet 116 is provided into third region 110. A fluid outlet 120 communicates with the first region.

Downward movement of second diaphragm 106 is transmitted to valve actuator 94 through a valve actuator part 122 which extends upward above diaphragm 98 and contacts the underside of diaphragm 106 when the diaphragms 98, 106 are in their undeflected orientations. O-ring seals in grooves 124, 126 prevent seepage of fluid from valve housing 56 and around valve seat 72, respectively. An O-ring seal in a groove 128 prevents seepage of fluid from the first region 102 through a screw hole in first diaphragm 98 which accommodates a screw by which valve actuator part 122 is attached to valve actuator 94. The upper, intermediate, and lower sections are held together, and the perimeters 100, 108 of diaphragms 98, 106, respectively, held in place by cap screws 130.

In addition, in many cases it is desirable to protect the sources of the signals coupled to inlets 114, 116 from the fluid on the first region 102 side of first diaphragm 98. This might be the case, for example, where the fluid in the first region 102 is a coating material such as a paint and the sources of the signals coupled to inlets 114, 116 are electrical signal-to-air pressure signal converters of the types employed in the control system described in U.S. Pat. No. 4,362,124. In order to provide this protection of the signal sources coupled to inlets 114, 116, the intermediate section, or bleed ring, 44 provides the isolation, or stand-off, region 53 of cavity 48. Vents 129 are provided around the periphery of intermediate section 44. Those vents 129 vent region 53 of section 44 so that any fluid which leaks from first region 102 upward past valve actuator 94, the O-ring in groove 128 and first diaphragm 98 will leak from regulator 40 through vents 129. A diaphragm 131 and a spacer 133 are inserted between first diaphragm 98 and valve actuator part 122 and held in place, respectively, by cap screws 130 and the screw which joins parts 122, 94. Region 53, vents 129 and diaphragm 131 thus further protect inlets 114, 116 from the fluid in first region 102.

Figure 3:
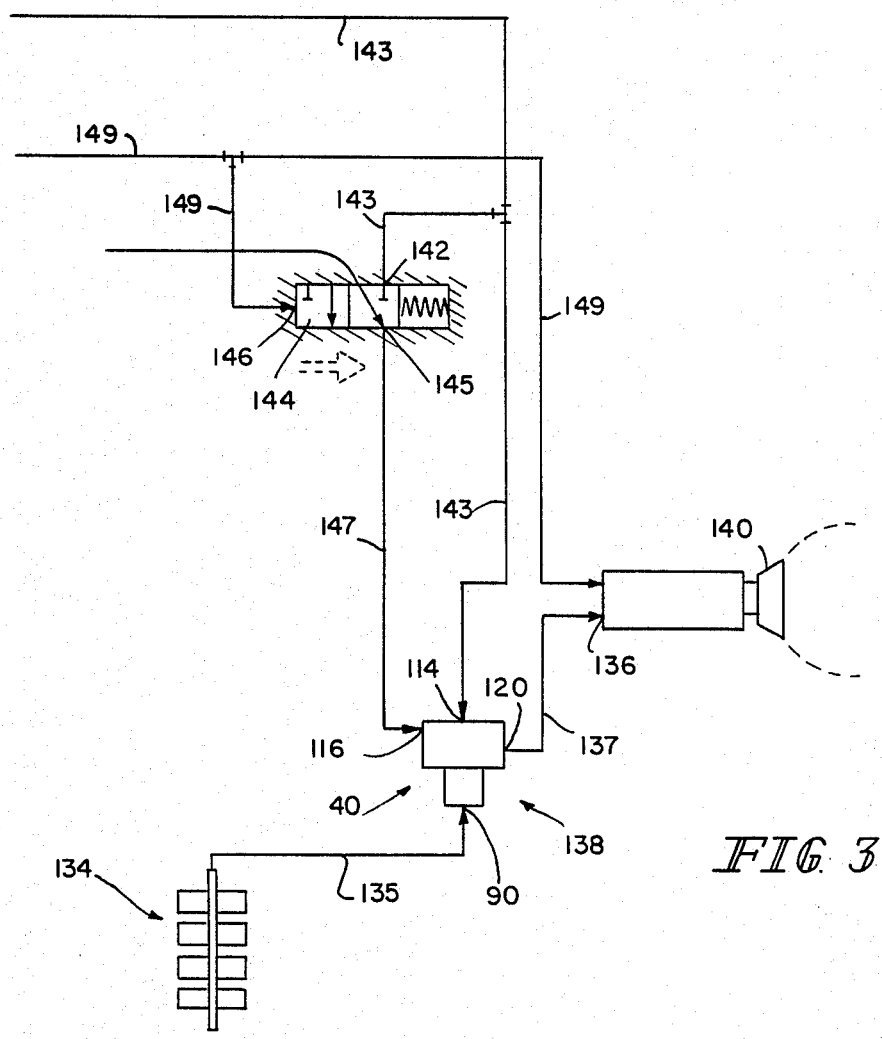
FIG. 3 illustrates a system for controlling the rate of flow of a selected one of a number of fluids to be dispensed through a fluid coating material dispensing circuit according to the present invention.

Turning now to FIG. 3, a system incorporating regulator 40 controls the rates of flow of selected coating materials and purging materials, such as solvents, from a multiple color manifold 134, such as the manifold illustrated in U.S. Pat. No. 4,311,724, to an output terminal 136 of a coating material dispensing circuit 138 which supplies coating material to a dispensing device 140, such as the devices illustrated in U.S. Pat. No. 4,148,932. The selected material flows from manifold 134 through a line 135 to the inlet end 90 of regulator 40. The outlet 120 of regulator 40 is coupled through a line 137 to the output terminal 136 of circuit 138. An analog fluid pilot signal from a system such as the system described in U.S. Pat. No. 4,362,124 is coupled through a line 143 to pilot pressure signal inlet 114 of regulator 40 and to one inlet terminal 142 of a three-way valve 144. An outlet 145 of three-way valve 144 is coupled through a line 147 to pilot pressure signal inlet 116 of regulator 40. A dump pilot signal, which may also be provided by a system such as that described in U.S. Pat. No. 4,362,124, is coupled through a line 149 to the control input 146 of three-way valve 144. Typically this dump pilot signal is also coupled through line 149 to the dispensing device 140.

When the three-way valve 144 is in its position illustrated in FIG. 3, the fluid (typically compressed air) pilot signal is supplied to inlet 114. Owing to the reduced area of second diaphragm 106 exposed to fourth region 112, the pilot signal causes a relatively lesser total force to be exerted downward on diaphragm 106 and transmitted through valve actuator part 122, spacer 133, valve actuator 94 and needle 96 to valve member 68. Under these circumstances, pilot signal pressure versus flow rate curve 26 of FIG. 1 is duplicated. When the dump pilot signal occurs at control input 146 of three-way valve 144, the analog fluid pilot signal is supplied not only to inlet 114 but also to inlet 116. Owing to the relatively larger area of first diaphragm 98 exposed to third region 110, the pilot signal causes a relatively greater total force to be exerted downward on diaphragm 131 and transmitted through spacer 133, valve actuator 94 and needle 96 to valve member 68. Under these circumstances, pilot signal pressure versus flow rate curve 20 of FIG. 1 is duplicated.

It should be understood that additional intermediate sections (not shown) can be "stacked" into regulator 40. Each can be provided with its own pilot signal input and a multiple mode regulator having characteristics in addition to those illustrated in FIG. 1 can be realized. These additional characteristics can have slopes shallower than the slope of curve 26, or slopes between curves 20 and 26, or slopes steeper than the slope of curve 20, as dictated by the needs of a particular application.

Figure 4:
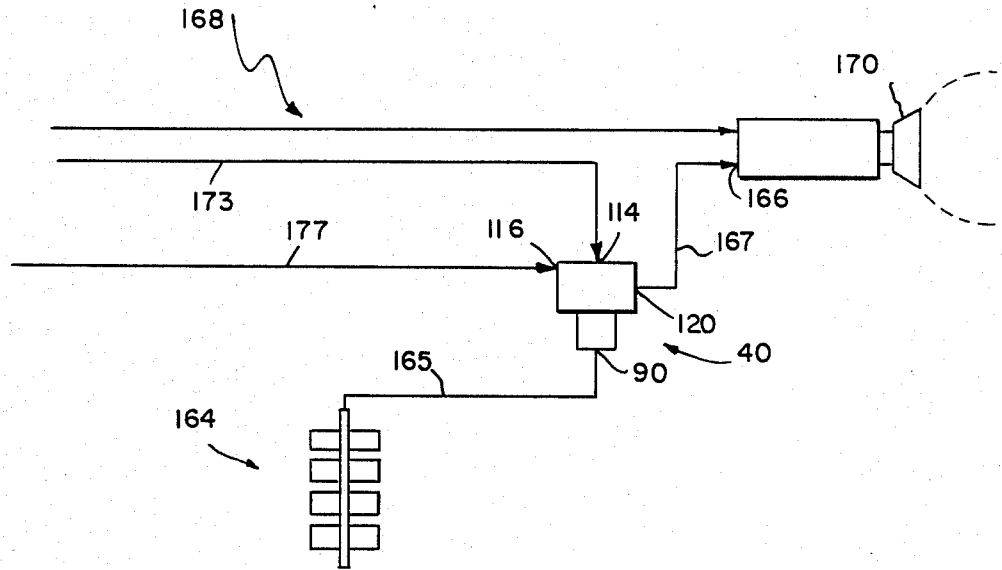
FIG. 4 illustrates another system for controlling the rate of flow of a selected one of a number of fluids to be dispensed through a fluid coating material dispensing circuit according to the present invention; and, FIG. 5 illustrates two control curves which help explain another use for the dual-mode regulator of the present invention.

Turning now to FIG. 4, another system incorporating regulator 40 controls the rates of flow of selected coating materials and purging materials, such as solvents, from a multiple color manifold 164, such as the manifold illustrated in U.S. Pat. No. 4,311,724, to an output terminal 166 of a coating material dispensing circuit 168 which supplies coating material to a dispensing device 170, such as the devices illustrated in U.S. Pat. No. 4,148,932. The selected material flows from manifold 164 through a line 165 to the inlet end 90 of regulator 40. The outlet 120 of regulator 40 is coupled through a line 167 to the output terminal 166 of circuit 168. A first analog fluid pilot signal from a system such as the system described in U.S. Pat. No. 4,362,124 is coupled through a line 173 to pilot pressure signal inlet 114 of regulator 40. A second analog fluid pilot signal from a system such as that described in U.S. Pat. No. 4,362,124 is coupled through a line 177 to pilot pressure signal inlet 116 of regulator 40. The two channels of control, lines 173, 177, are separately controllable through software written specifically for such an installation.

Figure 5:
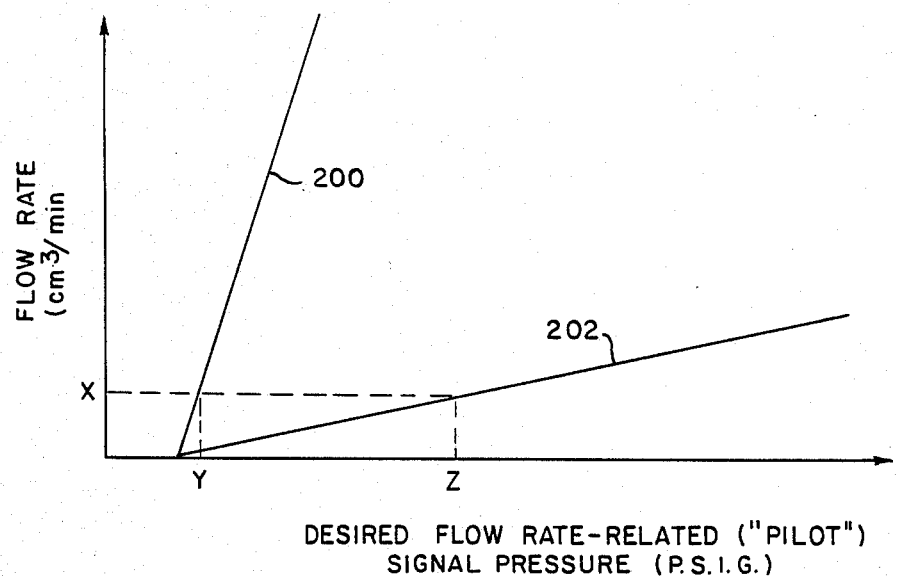

The regulator 40 of the present invention is also useful in other situations. For example, and with reference to FIG. 5, let it be assumed that articles being conveyed serially past a coating material dispensing device are to be coated alternately with a first coating material having a lower viscosity or a second coating material having a higher viscosity. Let it further be assumed that the same volume/minute, X $cm^3$/min., of either the first or second coating material is to be dispensed. It will be appreciated by referring to FIG. 5 that the delivery rate versus pilot signal pressure curve 200 for the first coating material has a much steeper slope than the delivery rate versus pilot signal pressure curve 202 for the second coating material. It will further be appreciated that a much lower pilot signal pressure Y p.s.i.g. will be required to deliver X $cm^3$/min of the first coating material, and that a much higher pilot signal pressure Z p.s.i.g. will be required to deliver X $cm^3$/min. of the second coating material. A system can readily be implemented using a regulator according to the present invention to provide the necessary substantially equal flow rates of two or more materials having quite different viscosities.

What is claimed is:

1. A regulator for controlling the flow rate of a liquid coating material being dispensed through a coating material dispensing circuit, the regulator comprising a regulator body defining a cavity, means defining a valve seat region in the cavity, means defining an entry port for the liquid coating material into the cavity on one side of the seat region, means defining an exit port for the liquid coating material from the cavity on the other side of the seat region, a movable valve member including a valve portion engageable with the valve seat region to close the cavity between the entry port and the exit port to control the flow of the liquid coating material between the entry port and the exit port and thereby control the liquid coating material pressure at the exit port, the valve member movable to a position at which the valve portion is out of engagement with the seat region to open a passageway for the liquid coating material between the entry port and the exit port, a first diaphragm, means for mounting the first diaphragm movably in the regulator body to divide the cavity into a first region in fluid communication with the passageway for accommodating the liquid coating material and a second region isolated from the liquid coating material under normal operating conditions, a second diaphragm, means for mounting the second diaphragm movably in the regulator body to divide the second region into a third region and a fourth region, the third region lying adjacent the first region and on the opposite side of the first diaphragm therefrom and the fourth region lying adjacent the third region and on the opposite side of the second diaphragm therefrom, means defining an entry port into the third region, means defining an entry port into the fourth region and means for coupling the first and second diaphragms to the movable valve member.

2. The apparatus of claim 1 wherein the area of the first diaphragm exposed in the first and third regions is relatively greater than the area of the second diaphragm exposed in the third and fourth regions.

3. The apparatus of claim 1 and further comprising a third diaphragm, means for mounting the third diaphragm movably in the regulator body in the third region, and means providing vent openings through the regulator body from the cavity to the exterior of the regulator body between the first and third diaphragms.

4. A system for controlling the rate of flow of a fluid dispensed in a fluid coating material dispensing circuit, the system including a source of a first fluid coating material to be dispensed from the coating material dispensing circuit, a source of a desired first fluid flow rate-related signal, a fluid utilization output, a fluid flow rate regulator for controlling the flow rate of the first coating fluid at the fluid utilization output in response to the desired first fluid flow rate-related signal, the regulator including a first fluid flow rate-related signal input port and a separate and distinct second flow rate-related signal input port, an input port for the first fluid, an output port for the first fluid, means for coupling the input port for the first fluid to the source of the first fluid, means for coupling the output port for the first fluid to the fluid utilization output, means for coupling the source of the first fluid flow rate-related signal to the first fluid flow rate-related signal input port, and means for coupling the source of the first fluid flow rate-related signal to the separate and distinct second flow rate-related signal input port.

5. The apparatus of claim 4 wherein the means for coupling the source of the first fluid flow rate-related signal to the first fluid flow rate-related signal input port and the means for coupling the source of the first fluid flow rate-related signal to the separate and distinct second flow rate-related signal input port comprises a three-way valve having a pilot input port and first and second pilot-controlled ports, the signal at the pilot input port alternatively isolating the first pilot-controlled port and venting the second pilot-controlled port or coupling the first pilot-controlled port and the second pilot-controlled port, a pilot signal source, means for coupling the pilot signal source to the pilot input port, means for coupling the first fluid flow rate-related signal source and the first fluid flow-rate related signal input port to the first pilot-controlled port, and means for coupling the separate and distinct second flow rate-related signal input port to the second pilot-controlled port.

6. The apparatus of claim 4 and further comprising a source of a second fluid to be dispensed from the fluid utilization output and means for coupling the input port for the first fluid to the source of the second fluid.

7. The apparatus of claim 6 wherein the means for coupling the input port for the first fluid to the source of the first fluid and to the source of the second fluid comprises a manifold, a first valve, a second valve, means for coupling the source of the first fluid to the first valve, means for coupling the first valve to the manifold, means for coupling the source of the second fluid to the second valve, means for coupling the second valve to the manifold, and means for coupling the manifold to the input port for the first fluid.

8. The apparatus of claim 7 wherein the second fluid is a purgative for purging the first fluid from at least a portion of the fluid coating material dispensing circuit.

9. The apparatus of claim 8 wherein the second fluid is a solvent for the first fluid.

10. The apparatus of claim 4 wherein the fluid flow rate regulator comprises a regulator body defining a cavity, means defining a valve seat region in the cavity, means defining an entry port into the cavity on one side of the valve seat region, means defining an exit port from the cavity on the other side of the valve seat region, a movable valve member including a valve portion engageable with the valve seat region to close the cavity between the entry port and the exit port, the valve member movable to a position at which the valve portion is out of engagement with the seat region to open a passageway between the entry port and the exit port, a first diaphragm, means for mounting the first diaphragm movably in the regulator body to divide the cavity into a first region in fluid communication with the passageway and a second region, a second diaphragm, means for mounting the second diaphragm movably in the regulator body to divide the second region into a third region and a fourth region, the third region lying adjacent the first region and on the opposite side of the first diaphragm therefrom, and the fourth region lying adjacent the third region and on the opposite side of the second diaphragm therefrom, the first fluid flow rate-related signal input port communicating with the fourth region and the second flow rate-related signal input port communicating with the third region.

11. The apparatus of claim 10 and further comprising a third diaphragm, means for mounting the third diaphragm movably in the regulator body in the third region, and means for providing vent openings through the regulator body from the cavity to the exterior of the regulator body between the first and third diaphragms.

12. A system for controlling the rate of flow of a fluid dispensed in a fluid coating material dispensing circuit, the system including a source of a first fluid coating material to be dispensed from the coating material dispensing circuit, a source of a second fluid to be dispensed from the coating material dispensing circuit, means for providing a desired first fluid flow rate-related signal, means for providing a desired second fluid flow rate related signal, a fluid utilization output, a fluid flow rate regulator for alternatively controlling the flow rate of the first fluid at the fluid utilization output in response to the desired first fluid flow rate-related signal or the flow rate of the second fluid at the fluid utilization output in response to the desired second fluid flow rate-related signal, the regulator including a first fluid flow rate-related signal input port and a second fluid flow rate-related signal input port, a selected fluid input port, a selected fluid output port, means for coupling the selected fluid input port alternatively to the source of the first fluid or the source of the second fluid, means for coupling the selected fluid output port to the fluid utilization output, means for coupling the source of the first fluid flow rate-related signal to the first fluid flow rate-related signal input port, and means for coupling the source of the second fluid flow rate-related signal to the second flow rate-related signal input port.

13. The system of claim 12 wherein the means for providing the desired second fluid flow rate related signal comprises a three-way valve having a pilot input port and first and second pilot-controlled ports, the signal at the pilot input port alternatively isolating the first pilot-controlled port and venting the second pilot-controlled port or coupling the first pilot-controlled port and the second pilot-controlled port, a pilot signal source, means for coupling the pilot signal source to the pilot input port, means for coupling the means for providing the desired first fluid flow rate-related signal and the first fluid flow-rate related signal input port to the first pilot-controlled port, and means for coupling the second flow rate-related signal input port to the second pilot-controlled port.

14. The apparatus of claim 12 wherein the means for coupling the selected fluid input port to the source of the first fluid and to the source of the second fluid comprises a manifold, a first valve, a second valve, means for coupling the source of the first fluid to the first valve, means for coupling the first valve to the manifold, means for coupling the source of the second fluid to the second valve, means for coupling the second valve to the manifold, and means for coupling the manifold to the selected fluid input port.

15. The apparatus of claim 12 wherein the second fluid is a purgative for purging the first fluid from at least a portion of the fluid coating material dispensing circuit.

16. The apparatus of claim 15 wherein the second fluid is a solvent for the first fluid.

17. The apparatus of claim 12 wherein the fluid flow rate regulator comprises a regulator body defining a cavity, means defining a valve seat region in the cavity, the selected fluid input port comprises means defining an entry port into the cavity on one side of the valve seat region, the selected fluid output port comprises means defining an exit port from the cavity on the other side of the valve seat region, a movable valve member including a valve portion engageable with the valve seat region to close the cavity between the entry port and the exit port, the valve member movable to a position at which the valve portion is out of engagement with the seat region to open a passageway between the entry port and the exit port, a first diaphragm, means for mounting the first diaphragm movably in the regulator body to divide the cavity into a first region in fluid communication with the passageway and a second region, a second diaphragm, means for mounting the second diaphragm movably in the regulator body to divide the second region into a third region and a fourth region, the third region lying adjacent the first region and on the opposite side of the first diaphragm therefrom, and the fourth region lying adjacent the third region and on the opposite side of the second diaphragm therefrom, the first fluid flow rate-related signal input port communicating with the fourth region and the second fluid flow rate-related signal input port communicating with the third region.

18. The apparatus of claim 17 and further comprising a third diaphragm, means for mounting the third diaphragm movably in the regulator body in the third region, and means for providing vent openings through the regulator body from the cavity to the exterior of the regulator body between the first and third diaphragms.

19. A regulator for controlling the flow rate of a liquid coating material being dispensed through a coating material dispensing circuit, the regulator consisting essentially of a regulator body defining a cavity, means defining a valve seat region in the cavity, means defining an entry port for the liquid coating material into the cavity on one side of the seat region, means defining an exit port for the liquid coating material from the cavity on the other side of the seat region, a movable valve member including a valve portion engageable with the valve seat region to close the cavity between the entry port and the exit port to control the flow of the liquid coating material between the entry port and the exit port and thereby control the liquid coating material pressure at the exit port, the valve member movable to a position at which the valve portion is out of engagement with the seat region to open a passageway for the liquid coating material between the entry port and the exit port, a first diaphragm, means for mounting the first diaphragm movably in the regulator body to divide the cavity into a first region in fluid communication with the passageway for accommodating the liquid coating material and a second region isolated from the liquid coating material under normal operating conditions, a second diaphragm, means for mounting the second diaphragm movably in the regulator body to divide the second region into a third region and a fourth region, the third region lying adjacent the first region and on the opposite side of the first diaphragm therefrom and the fourth region lying adjacent the third region and on the opposite side of the second diaphragm therefrom, means defining an entry port into the third region, means defining an entry port into the fourth region and means for coupling the first and second diaphragms to the movable valve member, the area of the first diaphragm exposed in the first and third regions being relatively greater than the area of the second diaphragm exposed in the third and fourth regions, a third diaphragm, means for mounting the third diaphragm movably in the regulator body in the third region, and means providing vent openings through the regulator body from the cavity to the exterior of the regulator body between the first and third diaphragms.

* * * * *